(12) United States Patent
Starr

(10) Patent No.: US 9,971,534 B2
(45) Date of Patent: May 15, 2018

(54) AUTHORITATIVE POWER MANAGEMENT

(71) Applicant: Matthew Thomas Starr, Lafayette, CO (US)

(72) Inventor: Matthew Thomas Starr, Lafayette, CO (US)

(73) Assignee: Spectra Logic, Corp., Boulder, CO (US)

( * ) Notice: Subject to any disclaimer, the term of this patent is extended or adjusted under 35 U.S.C. 154(b) by 87 days.

(21) Appl. No.: 14/523,673

(22) Filed: Oct. 24, 2014

(65) Prior Publication Data
US 2016/0117125 A1  Apr. 28, 2016

(51) Int. Cl.
| *G06F 1/32* | (2006.01) |
|---|---|
| *G06F 1/00* | (2006.01) |
| *G06F 1/26* | (2006.01) |
| *G06F 3/06* | (2006.01) |

(52) U.S. Cl.
CPC ............ *G06F 3/0625* (2013.01); *G06F 1/266* (2013.01); *G06F 1/3206* (2013.01); *G06F 1/3268* (2013.01); *G06F 1/3275* (2013.01); *G06F 3/0634* (2013.01); *G06F 3/0689* (2013.01); *G06F 1/26* (2013.01); *Y02D 10/14* (2018.01); *Y02D 10/154* (2018.01)

(58) Field of Classification Search
CPC ....................................... G06F 1/32; G06F 1/26
See application file for complete search history.

(56) References Cited

U.S. PATENT DOCUMENTS

| 7,171,571 | B2 | 1/2007 | Starr et al. | |
|---|---|---|---|---|
| 7,627,709 | B2 | 12/2009 | Bacom et al. | |
| 7,793,126 | B2* | 9/2010 | McGrane | G06F 1/26 713/300 |
| 8,615,322 | B2 | 12/2013 | Thompson et al. | |
| 2005/0210304 | A1* | 9/2005 | Hartung | G06F 1/3268 713/320 |
| 2007/0050644 | A1* | 3/2007 | Merkin | G06F 1/206 713/300 |
| 2007/0067657 | A1* | 3/2007 | Ranganathan | G06F 1/3296 713/320 |
| 2007/0245161 | A1* | 10/2007 | Shaw | G06F 1/3203 713/300 |
| 2009/0006606 | A1* | 1/2009 | Lubbers | H04L 41/0893 709/224 |
| 2009/0113221 | A1* | 4/2009 | Holle | G06F 1/189 713/310 |
| 2010/0058091 | A1* | 3/2010 | Lambert | G06F 1/263 713/330 |
| 2010/0162006 | A1* | 6/2010 | Therien | G06F 9/50 713/300 |
| 2010/0235840 | A1* | 9/2010 | Angaluri | G06F 1/329 718/102 |

(Continued)

*Primary Examiner* — Phil Nguyen
(74) *Attorney, Agent, or Firm* — Kenneth Altshuler

(57) ABSTRACT

An apparatus and associated method for interfacing a plurality of electronic devices with a network to execute input/output (I/O) commands. A power manager is configured to individually control amounts of power supplied to each of the electronic devices. The power manager selectively increases an amount of power supplied to a first one of the electronic devices based on an amount of power being supplied to a different second one of the electronic devices.

15 Claims, 7 Drawing Sheets

(56) References Cited

U.S. PATENT DOCUMENTS

| | | | |
|---|---|---|---|
| 2011/0029787 A1* | 2/2011 | Day | G06F 1/266 713/300 |
| 2011/0276190 A1* | 11/2011 | Lillis | H02J 3/005 700/293 |
| 2012/0139472 A1* | 6/2012 | Ishibashi | H02J 7/007 320/101 |
| 2013/0103968 A1 | 4/2013 | Conroy et al. | |
| 2013/0246820 A1* | 9/2013 | Branover | G06F 1/3296 713/320 |
| 2014/0371924 A1* | 12/2014 | Kodama | G06F 1/20 700/276 |
| 2015/0169366 A1* | 6/2015 | Billore | G06F 9/5038 718/103 |
| 2015/0234444 A1* | 8/2015 | Aasheim | G06F 1/3206 713/320 |
| 2015/0309752 A1* | 10/2015 | Ellis | G06F 3/0625 711/103 |

* cited by examiner

Storage Device
|  | $D_1$ | $D_2$ | $D_3$ | $D_4$ | $D_5$ | $D_6$ |
|---|---|---|---|---|---|---|
| $I/O_1$ | X | X | X |  |  |  |
| $I/O_2$ | X |  |  | X | X |  |
FIG. 5
Storage Device
$D_1$ $D_2$ $D_3$ $D_4$ $D_5$ $D_6$
 Present $I/O_1$  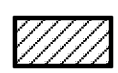 Increase $I/O_1$ + $I/O_2$
FIG. 6

AUTHORITATIVE POWER MANAGEMENT

CROSS-REFERENCE TO RELATED APPLICATIONS

None.

BACKGROUND OF THE INVENTION

1. Field of the Invention

The present invention relates generally to power management in systems that include a number of electronic devices.

2. Description of Related Art

Power budgets in large and/or complex computer systems are receiving more scrutiny lately. Large distributed data storage systems, for example, use a number of electronic data storage devices that are capable of operation at different power levels corresponding to different operational modes. For purposes of this description the storage devices can be self-contained storage devices such as disk drives and solid state drives, and they can be read/write devices, such as a tape drive. The storage devices experience a significantly higher utilization at some times in comparison to other times. Some storage activities can be time shifted to off-peak times to extend the benefits of reduced power level operation. It is to these improvements that the embodiments of the present technology are directed.

SUMMARY OF THE INVENTION

Some embodiments of this technology contemplate an apparatus having a plurality of electronic devices operably executing input/output (I/O) commands that are communicated via a network. A power manager is configured to individually control amounts of power supplied to each of the electronic devices by selectively increasing an amount of power supplied to a first one of the electronic devices based on an amount of power being supplied to a different second one of the electronic devices.

Some embodiments of this technology contemplate a computer apparatus having a plurality of digital data storage devices and a controller communicating input/output (I/O) commands with each of the digital data storage devices. Power control circuitry is configured to selectively increase an amount of power supplied to a first digital data storage device of the plurality based on an amount of power being supplied to a different second digital data storage device of the plurality.

Some embodiments of this technology contemplate a method that includes: obtaining a plurality of electronic devices configured to execute input/output (I/O) commands that are communicated via a network; and individually controlling amounts of power supplied to each of the electronic devices, selectively increasing an amount of power supplied to a first one of the electronic devices based on an amount of power being supplied to a different second one of the electronic devices.

BRIEF DESCRIPTION OF THE DRAWINGS

FIG. 5 diagrammatically depicts different resources that are employed in executing different input/output (I/O) access commands according to embodiments of this technology.

FIG. 6 diagrammatically depicts selectively setting different power levels for the resources in FIG. 5.

DETAILED DESCRIPTION

Initially, this disclosure is by way of example only, not by limitation. The power management concepts herein are not limited to use or application with any specific system or method. That is, the embodiments for storing digital data are illustrative and not limiting of the contemplated embodiments of this technology. Thus, although the instrumentalities described herein are for the convenience of explanation, shown and described with respect to exemplary embodiments, the skilled artisan understands that the principles herein may be applied equally in other types of systems and associated methods.

Figure 1:
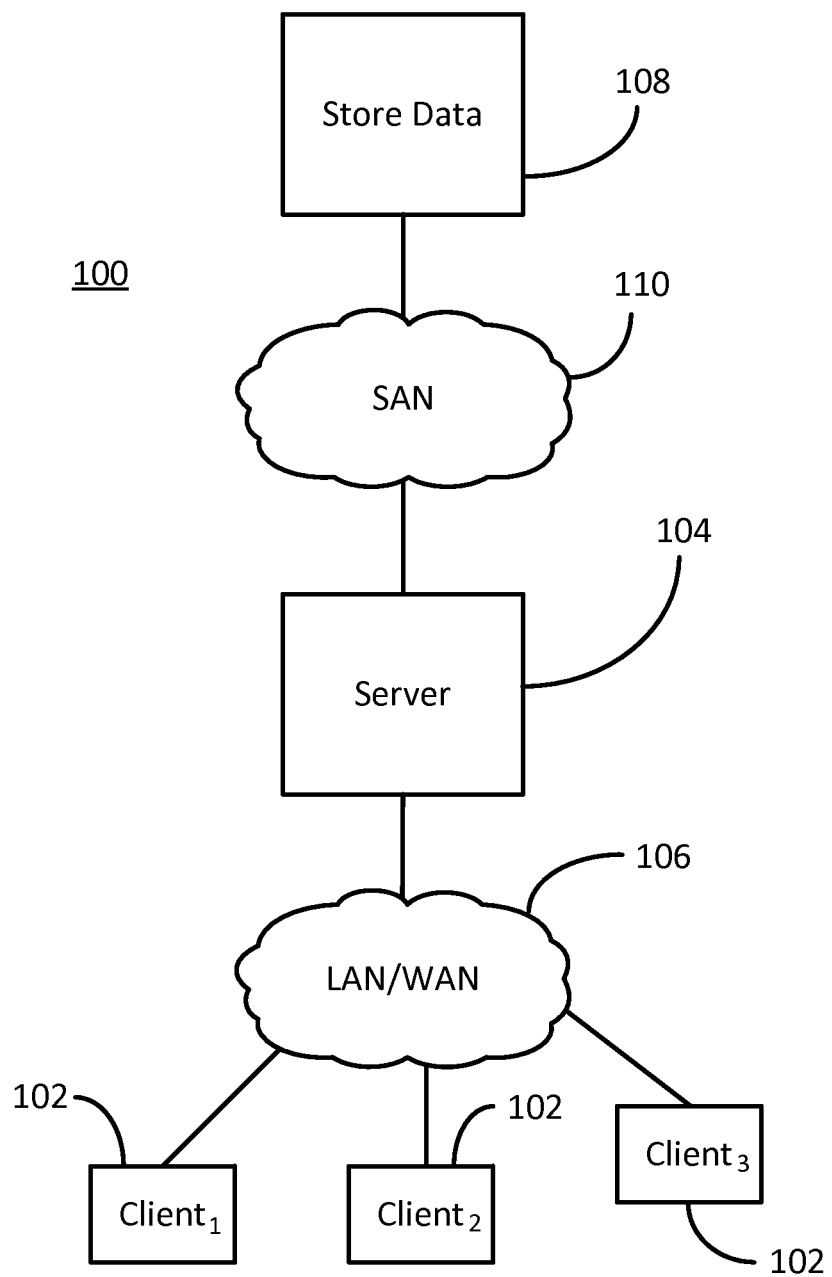
FIG. 1 is a block diagram of a computer system employing embodiments of this technology.

To illustrate an exemplary environment in which embodiments of the present technology can be practiced, FIG. 1 is a block diagram depiction of a computer system 100. One or more hosts 102 (three depicted as clients) are networked to one or more network-attached servers 104 (one depicted) via a local area network (LAN) and/or wide area network (WAN) 106. The LAN/WAN 106 can use Internet protocol (IP) networking infrastructure for communicating over the World Wide Web. The hosts 102 access software applications residing in the server 104 that routinely store data to and retrieve data from a data store 108. A storage area network (SAN) 110 connects the server 104 to storage devices collectively forming the data store 108. Data is transferred with the storage devices via various communication protocols, such as serial ATA and fibre-channel for example.

Figure 2:
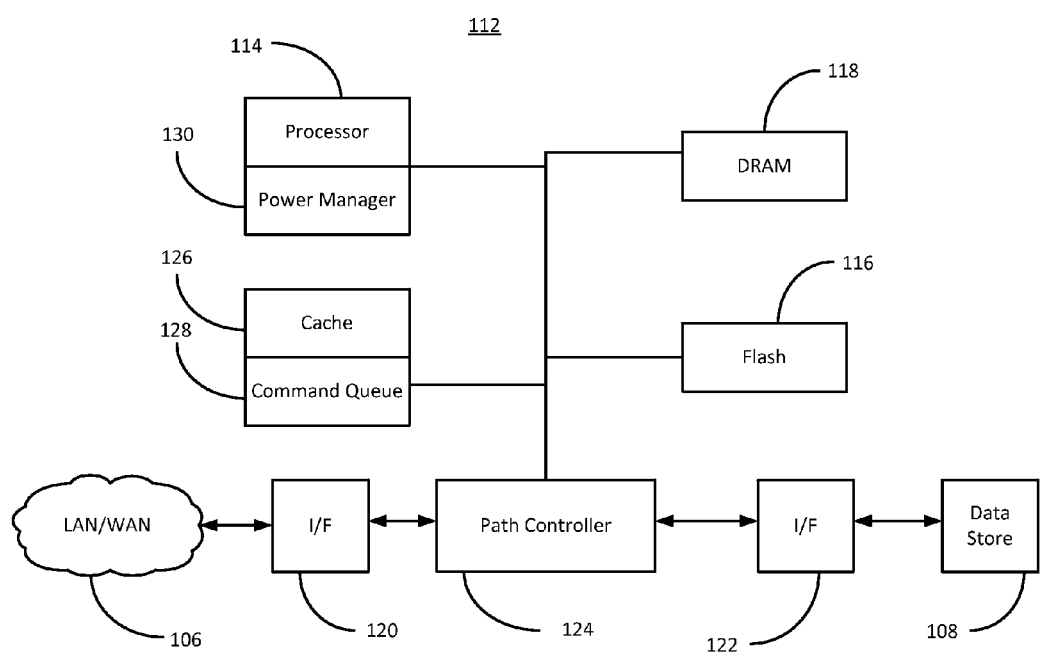
FIG. 2 is a block diagram of a storage controller in the computer system of FIG. 1.

FIG. 2 is a block diagram depiction of a storage controller 112 controlling the data transfers with the storage devices. The controller 112 can be embodied in a single integrated circuit or can be distributed among a number of discrete circuits, as desired. The controller 112 can reside anywhere within the computer system 100, such as in a network or in a network-attached device. A processor 114, such as a programmable computer processor, provides top level control in accordance with stored programming steps and processing data, such as can be stored in non-volatile memory 116 (flash memory or similar) and in dynamic random access memory (DRAM) 118. A fabric interface (I/F) circuit 120 communicates with other storage controllers (not depicted, such as redundant controllers) and with the hosts 102 via the fabric 106 (FIG. 1), and a device I/F circuit 122 communicates with the storage devices in the data store 108. The I/F circuits 120, 122 and a path controller 124 form a communication path to pass commands and data ("access commands") between the hosts 102 (FIG. 1) and the data store 108. A cache 126 can be used as a temporary repository for the access commands. By employing a writeback cache policy, a completion acknowledgement can be transmitted back to the initiating device (such as the host 102) before the data is actually written to the storage device(s). That permits scheduling execution of any access command to occur at a later, more convenient (efficient) time.

Access commands are flushed from the cache 126 into a command queue 128. In other words, the command queue 128 is populated to, in effect, grant permissions to issue cached access commands. A power manager 130 allocates power resources to enable electronic devices that are necessary for executing the flushed access commands.

The capacity of the data store 108 is organized into logical addresses that are referenced when transferring access commands with the storage devices. System configuration information defines the storage relationships between user data and any associated parity and/or mirror data. The system configuration information furthermore identifies the storage relationships between physical block addresses and the associated logical block addresses.

The controller 112 architecture advantageously provides scalable, highly functional data management and control of the data store 108. The system configuration information can further include data structures that are aligned to stripe boundaries on the storage devices. The data structures can reference data buffers in the cache 126 that are dedicated to storing the data associated with a storage stripe.

During operation, executing the access commands generally involves input-output (I/O) data transfers between the hosts 102 and the data store 108. Readback data retrieved from the storage devices, including non-requested speculative data, can be retained for a time in the cache 126 in an expectation of a "cache hit" in response to a subsequent access command. The throughput capacity of the computer system 100 is advantageously increased when a subsequent access command can be satisfied directly from the cache 126 instead of scheduling an I/O transfer with one or more of the storage devices.

Figure 3:
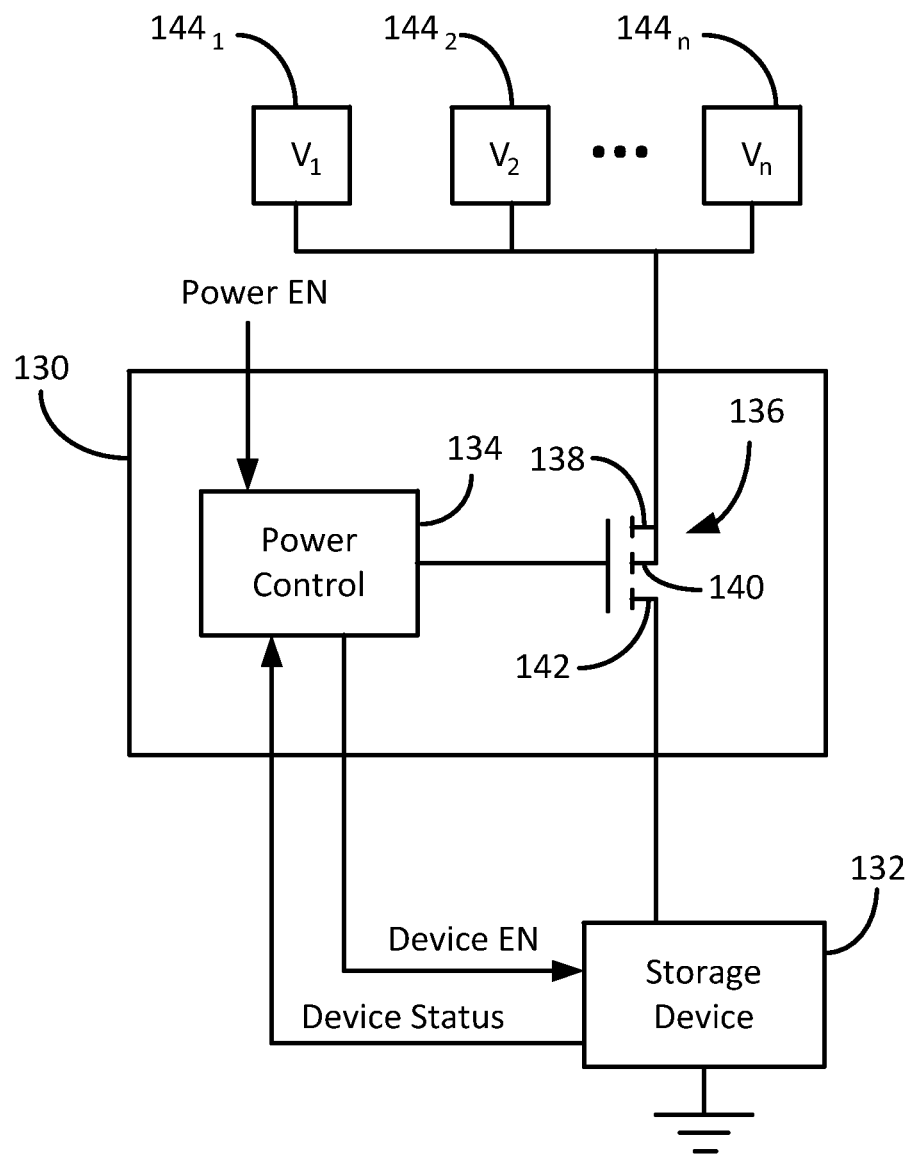
FIG. 3 is a block diagram of a power manager in the computer system of FIG. 1.

FIG. 3 is an illustrative functional block depiction of how the power manager 130 (FIG. 2) changes a power state of one of the storage devices 132 in the data store 108. Although only one storage device 132 is depicted, it will be understood that the power manager 130 can change power states to two or more of the storage devices 132 in the data store 108 in the same manner.

The power manager 130 includes a power control block 134 coupled to a switching device 136. The power control block 134 provides control outputs to the switching device 136 in response to operational inputs from the controller 112 (FIG. 2). The switching device 136 can be characterized as an n-channel MOSFET with a gate input coupled to the output of the power control block 134. The switching device 136 further has source-drain conduction paths 138, 140, 142 connected between different input power sources 144, such as $V_1, V_2, \ldots V_n$ depicted, and the storage device 132. In the absence of a gate input, the source-drain conduction path is preferably in a high impedance state.

The same structure can be repeated for each of the other storage devices, although not depicted. For example, there can be ten data storage devices 132 in the data store 108, each storage device 132 capable of operating at any of the three power inputs depicted ($V_1$, $V_2$, and $V_n$). In that example, it will be understood that the power control block 134 can include a total of thirty such conduction paths to the data storage devices $132_1, 132_2, \ldots 132_{10}$.

Figure 4:
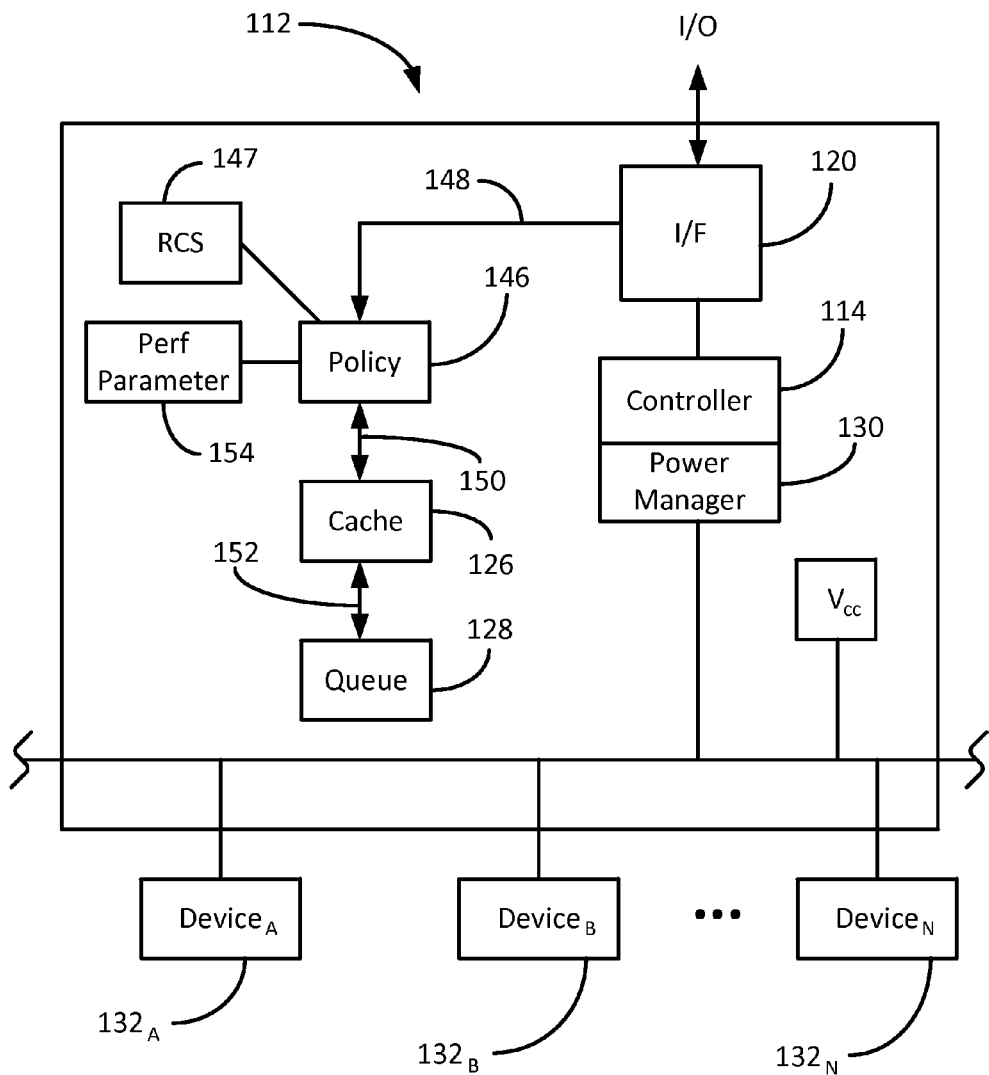
FIG. 4 is a more detailed block diagram of the storage controller and power manager in the computer system of FIG. 1.

FIG. 4 is a more detailed block diagram of the controller 112, configured in accordance with the present technology, is arranged to increase data processing performance. The command queue 128 contains a number of prioritized access commands (sometimes referred to as "I/O commands") from the cache 126. Although only one command queue 128 is depicted to simplify this description, there can be a dedicated command queue 128 for each storage device 132 to simultaneously transfer data with all of the storage devices 132.

Write commands received via the fabric I/F 120 are writeback cached in the cache 126 and held there until they are flushed from the cache 126. Flushing is controlled by a policy engine 146 that determines particular sets of write commands that can be simultaneously stored to the different storage devices 132. For example, without limitation, the sets of write commands can be defined by RAID ("redundant array of independent devices") container services (RCS) 147. The RCS 147 perform data transfers in accordance with RAID algorithms that aim to transfer parity stripes of data across a plurality of the storage devices 132. The functional blocks depicted in FIG. 4 can exist in software or hardware. In the latter, for example, the policy engine 146 can be constructed as a finite state machine.

The controller 112 continuously manages the writeback data processes to optimize throughput performance at each of a number of different operational modes, depending on system-wide conditions and requirements. For example, one operational mode generally involves periodically flushing constant-size blocks of data of a predetermined size. For example, flushing a stripe of RAID data when the entire RAID stripe is cached. Another operational mode generally involves flushing smaller and perhaps varying-size blocks of data. For example, indexing the cached data by age (e.g., time the data has spent in the cache waiting flushing) and flushing an access command when its age exceeds a predetermined age limit.

In accordance with this technology, the aggressiveness with which the cache 126 is flushed can be tied to the I/O load. That is, not flushing aggressively enough during a relatively high I/O load can cause the cache 126 to reach saturation. Conversely, flushing too aggressively during a relatively low I/O load can leave the cache deficient for satisfying potential cache hits. Both scenarios adversely affect data throughput performance.

The policy engine 146 can continuously collect qualitative data about access commands received via the fabric I/F 120 on an I/O-by-I/O basis via path 148. The policy engine 146 can dynamically characterize the I/O load and consequently issue rules via path 150 that govern the cache 126 which, in turn, populates the command queue 128 to define a command profile. The policy engine 146 also stays continuously apprised of the cache 126 state via path 152.

The policy engine 146 can also collect quantitative data about the I/O load in real time, such as the current rate of access commands coming from one or more network requesting devices. That enables the policy engine 146 to dynamically characterize the I/O load and continuously adjust the command profile to the storage devices 132 in relation to the characterization. For example, the policy engine 146 can continuously collect real time data characterizing the I/O load in terms of the ratio of rate sensitive commands (illustrated below) to latency sensitive commands (illustrated below). Writeback cache commands are considered to be rate sensitive commands because it does not matter so much which requests are flushed to the storage devices 132 at any point in time. In fact, rate sensitive commands may even be overwritten while pending in cache 126 as dirty data. What matters is that rate sensitive commands get flushed at a rate that prevents the cache 126 from reaching saturation or starvation.

On the other hand, an access command to read data that is stored in one or more of the storage devices 132 will likely cause the host application to block further processing until the access command is satisfied. The time it takes to satisfy the access command for read data, the latency period, is critical to the performance of the application. Such access commands are thereby referred to as latency sensitive commands. Further, in certain circumstances the host can opt to not authorize writeback caching. In that case an access command for writing data, called a writethrough command, is likewise categorized as a latency sensitive command.

The policy engine 146 can also collect quantitative data characterizing the I/O load in other terms such as the size of the associated data file (bandwidth), the particular host 102 and/or network device initiating the access command, storage device 132 information such as access history, timestamp data, RAID class, and the LUN class to which the access command is directed.

In collecting quantitative data the policy engine 146 preferably tallies counts during each of a predetermined sample interval, such as each one-second interval. A free running counter can be set with a pointer moving the index on one-second boundaries to continuously track the ratio. The counter holds a desired number of previously observed ratios, such as the previous eight one-second sample ratios, with a ninth slot for tallying the current one-second ratio. On the one-second boundaries the index cycles, subtracts the indexed historical value and adds the latest sample value, then divides by eight to calculate the most recent running average of the ratio.

The policy engine 146 can be responsive to performance parameters 154 in formulating rules for flushing the cache 126. The parameters 154 can be quantitative or qualitative. The parameters 154 can include goals, such as but not limited to enforcing a desired command profile that is some factor of the network I/O load in terms of the ratio of latency sensitive commands to rate sensitive commands (ratio of read to write commands for writeback caching), enforcing assigned priorities to different LUN classes, enforcing a desired read command latency, and the like. The policy engine 146 thus can correlate the I/O load characterization with the predefined performance parameters 154 to define the rules for flushing the cache 126. Additionally, the parameters 154 can include system condition information. For example, a power supply indicator may inform the policy manager 146 that the computer system 100 has switched to a backup battery power source. In this condition the policy manager 146 can respond by implementing contingencies to aggressively flush the cache 126 because of the limited power availability. The parameters 154 can also include the state of pending background I/Os, meaning I/Os that are not directly involved with executing access commands.

Figure 7:
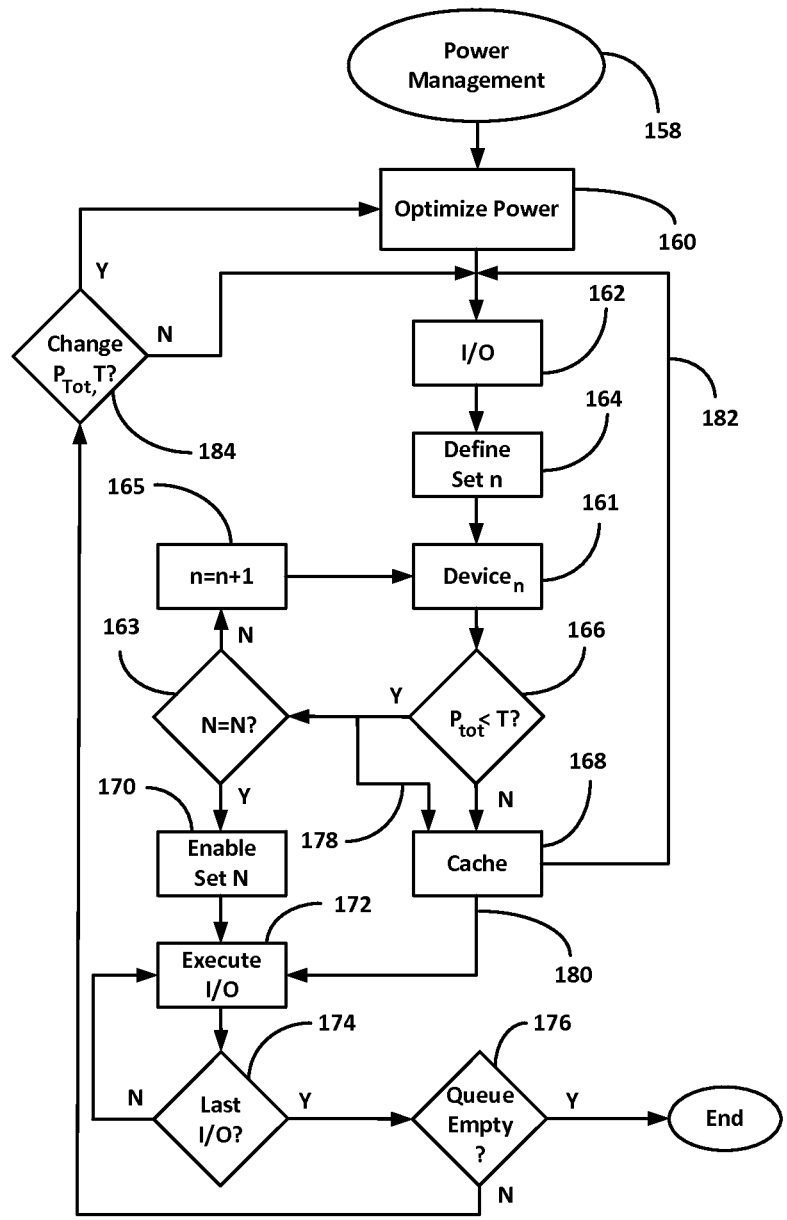
FIG. 7 is a flowchart depicting steps in a method for POWER MANAGEMENT in accordance with embodiments of this technology.

FIGS. 5, 6, and 7 diagrammatically depict illustrative methodology by which the computer system 100 performs power management in accordance with this technology. For purposes of an example, FIG. 5 depicts two I/O commands presently stored in the cache 126 (FIG. 4), the $I/O_1$ transferring data with data storage devices $D_1$, $D_2$, $D_3$, and the $I/O_2$ transferring data with data storage devices $D_1$, $D_4$, $D_5$. FIG. 6 depicts the amount of power allocated to each of the storage devices 132. For purposes of this example each of the storage devices is selectively operable at different voltage levels from lowest voltage $V_1$ to highest voltage $V_3$. For example, $V_1$ can be a standby power level of the data storage devices 132, whereas $V_3$ can be a higher read/write power level. In that case $V_2$ can be an intermediate low power idle power level.

For purposes of this example, the hatching patterns in FIG. 6 depict the changes in power that are necessary to execute $I/O_1$ and $I/O_2$. That is, to execute $I/O_1$ requires at least the $V_1$ voltage in storage device $D_1$ and the $V_2$ voltage in storage devices $D_2$ and $D_3$. Executing $I/O_2$ requires the higher $V_2$ voltage in storage device $D_1$, and the $V_1$ voltage in storage devices $D_4$ and $D_5$. The power manager 130 is configured to individually control amounts of power supplied to each of the storage devices 132, as described above. In doing so, the power manager 130 selectively increases an amount of power supplied to one of the storage devices 132, such as increasing the power level from $V_1$ volts to $V_2$ volts in storage device $D_1$, and such as increasing the power level from a lower mode (such as sleep mode) to $V_1$ volts in storage device $D_4$. Generally, in this technology the power manager 130 selectively increases the power to one of the storage devices 132 based on an amount of power being supplied to a different storage device 132. Particularly, as explained below, the power manager 130 increases the amount of power supplied to one storage device 132 if the increased amount of power is less than a predetermined threshold level of power. Generally, the power manager 130 selectively increases the amount of power to one storage device 132 based on the amount of power already being supplied to all of the storage devices 132 making up the data store 108. Alternatively, the power manager 130 can inquire individually to one or more of the storage devices 132 to determine what the existing power level is. That power level can be used to define the threshold for determining whether or not to increase the power level to another storage device 132.

FIG. 7 (in conjunction with FIG. 4) depicts a flowchart of steps in a method 158 for POWER MANAGEMENT in accordance with illustrative embodiments of the present technology. The method 158 begins in block 160 where the policy manager 146 and power manager 130 cooperatively optimize the total amount of power to the computer system 100, in view of the present operating parameters. As discussed above, for example, during business hours with a heavy I/O load the optimal total power is likely to be relatively high to support aggressive flushing of the cache 126 to prevent saturation. The policy manager 146 also derives a threshold value, T, that is greater than the optimal power level for purposes of the power management control that follows. The value of T can be derived from predetermined margins of the optimal power within which normal variation is either predicted or empirically observed.

In block 162 the policy manager 146 considers the next I/O command received from the network. In block 164 the policy manager 146 defines which storage devices ($D_1$-$D_6$) are necessary (the "set") to execute this I/O command, and at what voltage levels the set is necessary to execute the I/O command. Instead of operating on the individual storage devices 132, the power manager 146 advantageously increases the amount of power to the entire set of storage devices $D_1$-$D_6$ only if a predetermined condition is met. For example, the power manager 146 increases power levels to each storage device $D_1$-$D_6$ in the set if a sum of the increased amount of power to the set and the amount of power already being supplied to another storage device is less than T.

Assume for the example of FIG. 6 that the computer system 100 is at the moment sufficiently powered to execute $I/O_1$, and the policy manager 146 is presently considering $I/O_2$ in block 162. In that event the set defined in block 164 is storage device $D_1$ at $V_2$ volts, and storage devices $D_4$ and $D_5$ at $V_1$ volts. If the I/O command pending in block 162 is flushed from the cache then the total power requirement, $P_{tot}$ is $(3*V_2+2*V_1)$. Block 161 proceeds with consideration of just the first storage device $D_1$ in the set defined in block 164. If the determination of block 166 is favorable, then blocks 163 and 165 increment consideration to the next storage device in the set until all the storage devices $D_1$-$D_6$ in the set are included in the consideration.

In block 166 the policy manager 146 determines whether $P_{tot}$ is less than the predetermined T. If the determination of block 166 is "no," then the I/O command (sometimes referred to as "access command") considered in block 162 remains cached in block 168. However, if the determination of block 166 is "yes," then in block 170 the power manager 146 switches the power to enable the set derived in block 164. The I/O command considered in block 162 is flushed to the command queue 128 in block 172. The command queue 128 is continuously executed in blocks 174, 176 until empty.

The policy manager 146 can continuously flush the cache 126 in view of the current power settings, as depicted by input 178 and flushing stream 180. Otherwise, aged access commands in the cache 126 can be re-evaluated via control branch 182. The $P_{tot}$ and T are periodically evaluated in block 184, in view of any changing parameters. $P_{tot}$ can be decreased, for example, if the current parameters allow and/or a particular storage device D has been unused at its present power setting for longer than a predetermined time. In any event, control then passes back to consideration of the next I/O command in block 162, whether it be from the network or the cache 126.

Although not depicted in FIG. 7, in equivalent embodiments the power manager, after learning the determination of block 166 is "no," can opt to nonetheless increase the amount of power to one or more storage devices of the set but to a derated power level that satisfies the $P_{tot}$ being less than T.

Figure 8:
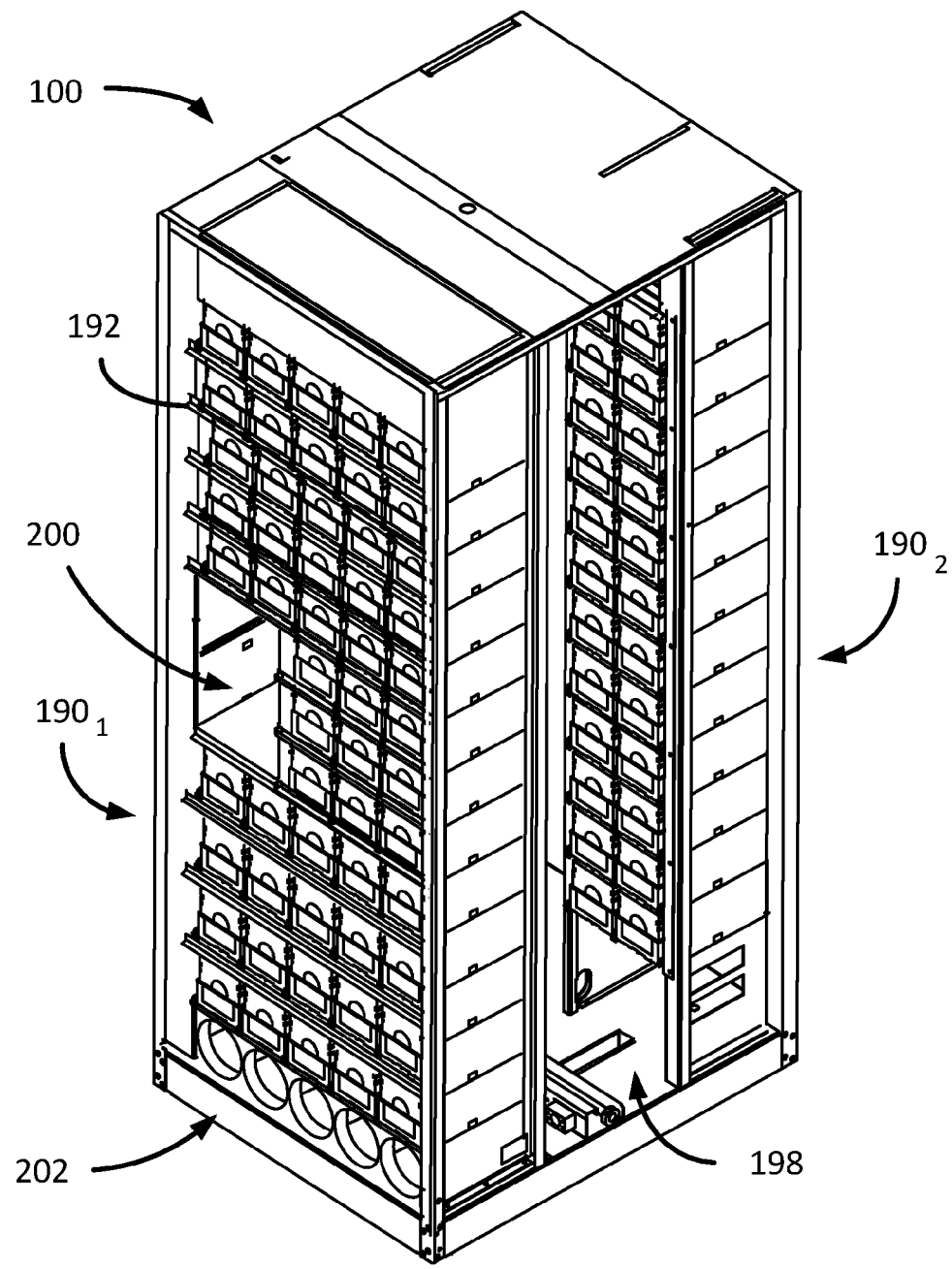
FIG. 8 is an isometric depiction of a tape storage library utilizing embodiments of this technology.

Embodiments of the present invention can be commercially practiced in a Spectra Logic T-950 tape cartridge library manufactured by Spectra Logic of Boulder Colo. FIG. 8 shows a commercial embodiment of one T-950 tape library without an enclosure. The T-950 tape library has first and second shelf systems 190$_1$, 190$_2$ that support a plurality of the mobile media, such as the magazine 192 holding a plurality of LTO tape cartridges with MAMs, archived by the tape library. The shelf systems 190$_1$, 190$_2$ can each have at least one auxiliary memory reader. Disposed next to the second shelf system 190$_2$ are at least four IBM LTO tape drives to write data to and read data from a tape cartridge. The IBM LTO tape drives each have the capability of storing data to an auxiliary radio frequency memory device contained in an LTO tape cartridge. Between the first and second shelf systems 190$_1$, 190$_2$ is a magazine transport space 198. The magazine transport space 198 provides adequate space for a magazine 192 to be moved, via the transport unit, from a position in the first shelf system 190$_1$, for example, to a tape drive. The transport unit can further accommodate at least one auxiliary radio frequency memory device reader. Magazines 192 can be transferred into and out from the T-950 tape library via the entry/exit port 200. Transferring magazines 192 in and out of the T-950 tape library can be accomplished by an operator, or by an automated material handling system. The T-950 tape library has cooling fans 202 located in the base. The T-950 tape library can be linked to a central data base to control movement of the auxiliary radio frequency memory devices as indicated by readings from the device readers. The T-950 tape library also includes a library central processing unit providing top-level control and coordination of all processes. The T-950 tape library also provides a graphical user interface displaying assessment results or simple messages such as an audible or visual alert accompanying recommendations for further action(s).

It is to be understood that even though numerous characteristics and advantages of various embodiments of the present invention have been set forth in the foregoing description, together with the details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, multiple write commands can be simultaneously interleaved by the path controller 112 in performing the I/O command throughput for example, while still maintaining substantially the same functionality without departing from the scope and spirit of the claimed invention. Another example can include using these techniques across multiple libraries, while still maintaining substantially the same functionality without departing from the scope and spirit of the claimed invention. Further, though communication is described herein as between a host and the tape library, communication can be received directly by a tape drive, via the fabric interface for example, without departing from the scope and spirit of the claimed invention. Further, for purposes of illustration, a tape drive and tape cartridges are used herein to simplify the description for a plurality of drives and tape cartridges. Finally, although the preferred embodiments described herein are directed to tape drive systems, and related technology, it will be appreciated by those skilled in the art that the claimed invention can be applied to other systems, without departing from the spirit and scope of the present invention.

It will be clear that the claimed invention is well adapted to attain the ends and advantages mentioned as well as those inherent therein. While presently preferred embodiments have been described for purposes of this disclosure, numerous changes may be made which readily suggest themselves to those skilled in the art and which are encompassed in the spirit of the claimed invention disclosed and as defined in the appended claims.

It is to be understood that even though numerous characteristics and advantages of various aspects have been set forth in the foregoing description, together with details of the structure and function, this disclosure is illustrative only, and changes may be made in detail, especially in matters of structure and arrangement to the full extent indicated by the broad general meaning of the terms in which the appended claims are expressed.

What is claimed is:

1. An apparatus comprising:
   a plurality of electronic devices configured to execute input/output (I/O) commands with a computer host via a computer network;
   a storage controller coupled between the computer host and the plurality of electronic devices, the storage controller configured to control the execution of the I/O commands, the storage controller comprising:
   a cache configured to temporarily store the I/O commands;
   a command queue configured to obtain the I/O commands flushed from the cache;
   a policy manager configured to dynamically characterize a network I/O load, to identify a threshold power value that varies in relation to the network I/O load, to identify a set of two or more of the electronic devices that are all needed to completely execute a selected I/O command, to determine what the total amount of power is that is necessary to enable the entire set of electronic devices to execute the selected I/O command, and to implement a write-back policy to flush the selected one of the I/O commands from the cache to the command queue if the total amount of power is less than the threshold power value and if an amount of used storage capacity in the cache is within a predetermined desired range, else configured to maintain the selected I/O command in the cache; and a power manager responsive to the policy manager and configured to individually supply power to each of the electronic devices to execute the selected I/O in response to flushing the selected one of the I/O commands from the cache to the command queue.

2. The apparatus of claim 1 wherein the power manager is configured to set the predetermined threshold amount of power to a value that maintains operation of the apparatus within a desired power mode setting.

3. The apparatus of claim 2 wherein the power manager is configured to change the power mode setting based on the used amount of storage capacity in the cache.

4. The apparatus of claim 2 wherein the predetermined threshold amount of power maintains operation of the apparatus at a standby power level.

5. The apparatus of claim 2 wherein the predetermined threshold amount of power maintains operation of the apparatus at an idle power level.

6. The apparatus of claim 1 wherein each of two or more of the electronic devices is a nonvolatile digital data storage device.

7. The apparatus of claim 1 wherein each of two or more of the electronic devices is a tape drive device.

8. The apparatus of claim 1 wherein the policy manager dynamically characterizes a plurality of the I/O commands in terms of a number of rate sensitive commands in comparison to a number of latency sensitive commands.

9. A method, comprising:
operating a computer system that has a plurality of electronic devices configured to execute I/O commands with a computer host via a network;
temporarily storing the I/O commands in a cache;
for a selected I/O command, identifying a set of two or more of the electronic devices that are all needed to completely execute the selected I/O command;
determining what total amount of power is needed to enable the entire set of electronic devices to execute the selected command;
comparing the total amount of power needed to enable the entire set of electronic devices to a predetermined threshold power value;
comparing an amount of used storage capacity in the cache to a predetermined desired range;
flushing the selected I/O command from the cache to a command queue if the needed amount of power is less than the threshold power value and if the amount of used storage capacity is within the desired range; and
in response to the flushing step, supplying power to enable the set of electronic devices to execute the selected I/O command.

10. The method of claim 9 wherein the supplying power step comprises individually adjusting the amount of power supplied to each electronic device in the set of electronic devices.

11. The method of claim 9 comprising caching the selected I/O command if the comparing step indicates the amount of power needed is more than the power threshold power value.

12. The method of claim 9 comprising periodically revising the predetermined threshold power value based on changes to the used storage capacity in the cache.

13. The method of claim 12 wherein the predetermined threshold power value comprises a predetermined power mode setting.

14. The method of claim 9 wherein the electronic devices are digital storage devices.

15. The method of claim 14 wherein the electronic devices are data storage drives.

* * * * *